Nov. 24, 1931.   A. R. KEELER   1,833,713
TRACTION CONNECTION AND THE LIKE
Filed March 29, 1928   6 Sheets-Sheet 1

Nov. 24, 1931.  A. R. KEELER  1,833,713
TRACTION CONNECTION AND THE LIKE
Filed March 29, 1923  6 Sheets-Sheet 3

Nov. 24, 1931.　　　A. R. KEELER　　　1,833,713
TRACTION CONNECTION AND THE LIKE
Filed March 29, 1928　　　6 Sheets-Sheet 6

Inventor:
Alonzo R. Keeler
By Thos. A. Banning
atty.

Patented Nov. 24, 1931

1,833,713

UNITED STATES PATENT OFFICE

ALONZO R. KEELER, OF ALTONA, ILLINOIS

TRACTION CONNECTION AND THE LIKE

Application filed March 29, 1928. Serial No. 265,612.

This invention has to do with improvements in traction connections. More particularly it has to do with improvements in push bar connections by means of which the traction of a pushing machine such as a tractor is communicated to an implement or machine in advance thereof and which is to be pushed over a field or along the road.

More especially the features of the present invention relate to improvements in such machines as the foregoing in which the implement being pushed takes the form of an agricultural implement such as a corn gathering machine or the like. It will presently appear however that certain features of the invention are not limited to use in connection with traction machines for pushing corn gathering implements, but may also be used with advantage for the pushing and maneuvering of other forms of agricultural machine as well as other forms of land working implement such as snow plows, etc. However, inasmuch as the construction herein disclosed has been devised especially with a view to meeting the requirements in the pushing and maneuvering or corn gathering machines, and inasmuch as certain of the features of the invention are especially applicable to this class of work I have herein illustrated and will describe a construction intended especially for this class of service. In so doing however, I wish it clearly understood that I do not intend thereby to limit the usefulness of the features of the invention except as I may do so in the claims.

The traction machine herein disclosed has also been devised especially for the purpose of pushing or maneuvering corn gathering machines or the general type disclosed in Letters Patent of the United States No. 1,219,327, issued to me March 13, 1917; and the construction herein disclosed also incorporates certain of the features disclosed in Letters Patent of the United States No. 1,657,360, issued to me January 24, 1928. In the general type of combination machine disclosed in said Letters Patent No. 1,657,360, there is provided a traction hitch or connection whereby a tractor located behind the corn gathering machine is so connected thereto that the traction machine itself together with the corn gathering implement constitute substantially a unitary combination structure. The traction connection thus established reaches beneath the traction machine itself and is attached to the draw bar connection at the rear end of the traction machine by means of an arrangement which permits the traction connection to rock about a horizontal longitudinally extending axis. The front end of the traction connection is attached to the corn gathering implement itself and is supported thereby so that the weight of the front end of the traction connection is borne by the steering wheels of the corn gathering machine. The traction connection also is secured to the front portion of the tractor by an attachment thereto which permits the tractor proper to rock with respect to the traction connection on a longitudinally extending axis.

By the foregoing arrangement the combined weight of the tractor and the corn gatherer is carried by the traction wheels at the rear end of the tractor and by the steering wheels of the corn gatherer at the front end of the combined unit, and the front and rear portions of the combined unit are articulated together so that they can rock with respect to each other on a longitudinally extending axis and by what corresponds to a three point suspension. By this means the combined implement is enabled to travel over the uneven surface of the ground, maintaining all four of the wheels always in firm and full load contact with the ground and without straining or warping any portions of the combined unit at points where they are not intended to warp.

The corn gathering implement itself is provided with forwardly reaching points or aprons which are intended to travel close to the surface of the ground or in line contact therewith so as to insure proper raising and gathering of corn ears from down stalks and the like. Even when traveling over uneven ground these points should always maintain the same operative contact with the surface of the ground. In the construction of traction machine disclosed in my earlier Patent No. 1,657,360 the traveling of the steering wheels into ruts or other low places causes a depression of the front portion of the corn gathering implement, and the riding of the rear traction wheels onto high ground causes a similar result. Conversely a riding of the front steering wheels onto a high place or a riding of the rear traction wheels into a low place causes an elevation of the front portion of the corn gathering implement. The forwardly extending movable mounted points or aprons are capable of such an amount of adjusting movement as will take care of the slight unequalities in the surface of the ground. However, it has been found that excessive variation or inequalities in the surface being traveled on result either in forcing the front portion of the corn gathering implement down solidly against the surface of the ground or else the front portion of the corn gathering implement is raised entirely clear of the surface of the ground depending on the nature of the inequalities encountered. In the former case it has sometimes happened that the entire load of the front portion of the combined machine has been imposed on the front portion of the corn gathering implement so that the steering wheels have been relieved of their normal burden; and in some cases this has resulted in breaking of parts or other damage to the machine and in other cases has resulted in inability to properly manipulate or maneuver the machine.

The main object of the present invention is to provide a traction connection between the tractor and the agricultural implement of such a nature that the operator may from time to time cause a tilting action to take place which will either raise or lower the front portion of the agricultural implement with respect to the tractor unit; and the amount of this possible adjustment is made sufficiently large to enable the operator to keep the front portion of the corn gathering implement at its proper position with respect to the ground surface even under extreme conditions which could not be successfully maneuvered with the previous construction of the machine.

More particularly it is an object to provide an arrangement such that the operator can almost immediately and on very short notice either raise or lower the front portion of the machine, thus enabling him to follow the variations in the ground surface with rapidity if necessary.

It is a further object in connection with the foregoing to provide a combined machine which is very nicely balanced so that the amount of force which the operator must exercise in performing the foregoing evolution will be relatively small. This balancing is secured by establishing a transverse pivotal point or axis substantially at the line where the loads are naturally in a condition of balance.

It is also an object of the invention to bring the control lever or operating device by means of which the foregoing evolutions are formed to a position where said part is conveniently within reach of the operator in his normal operating position. In this connection the combined form of machine disclosed in the aforesaid Patent No. 1,657,360 is provided with a platform or operating stand to which all of the different controls for steering, engine operation, etc., have been brought. The operating lever for tilting the front portion of the corn gathering implement is also brought to a position close to this operating stand.

A further feature of the invention relates to improvements in the driving connection for transmitting power from the tractor engine forwardly into the corn gathering portion of the implement so as to operate the latter by power derived from the tractor engine. In this connection I will state that such a connection is disclosed in my earlier Patent No. 1,657,360.

One of the objects of the present invention is to provide an adjustable connection for this power, which connection is so arranged that it will automatically adjust itself as the tilting is performed so that the proper driving connection will always be maintained without particular thought on the part of the operator.

A further feature of the invention relates to the provision of constructions such that the corn gathering portion of the implement is in effect a self-contained machine which can be completely disconnected from the traction machine, the traction hitch being then removed, and the tractor itself may be then used in its normal fashion after replacing its proper steering wheels.

Other objects and uses of the invention will appear from a detailed description of the same which consists in the features of construction and combinations of parts hereinafter described and claimed.

In the drawings:

Fig. 2 shows a view similar to that of Fig. 1 but showing the agricultural implement tilted forward or down, and Fig. 2 is a perspective view more nearly looking directly toward the side than Fig. 1;

Fig. 3 shows a fragmentary detailed side view of the connection between the front end of the traction connection and the rear portion of the agricultural implement, the tilting lever being thrown somewhat forward of the central position so as to lower the front portion of the agricultural implement. Fig. 3 also shows the belt tightener and equalizer device in the corresponding position;

Figs. 9 and 10 are both on enlarged scale as compared to Figs. 7 and 8.

Figure 1:
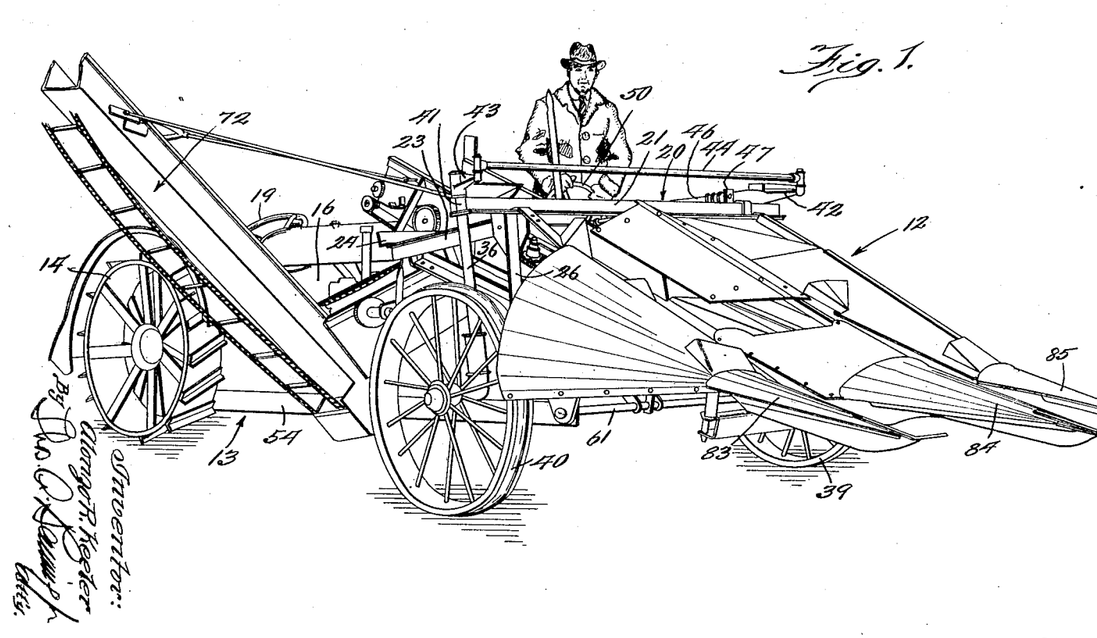
Figure 1 shows a perspective view of a combined machine embodying the features of the present invention, the agricultural implement being tilted up or raised to its high position.
Figure 2:
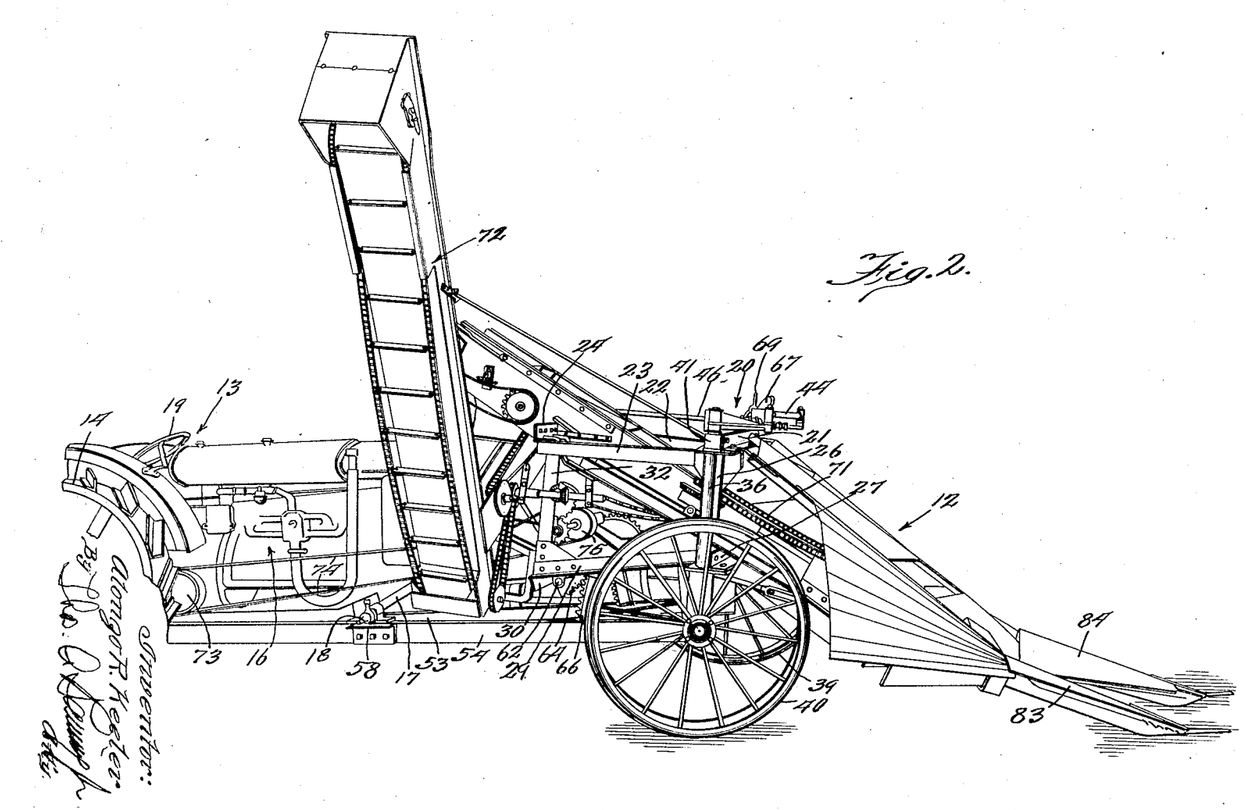

Referring first to Figs. 1 and 2 in particular, I have illustrated an agricultural implement 12 in the form of a two row corn gatherer, the same being operatively attached to the front portion of a familiar construction of tractor 13. The tractor illustrated happens to be what is known as a Fordson tractor, although it will be understood that I do not limit the usefulness of my invention to this or any other particular machine except as I may do so in the claims. The tractor illustrated includes the two rear traction wheels 14 and 15 (only one of which happens to appear in Figs. 1 and 2). This tractor also includes the usual engine 16 and appurtenances including the driving connections for the rear wheels. This tractor also includes a transverse front axle 17 which is swivelly mounted on the front portion of the base of the engine so that said front axle may tilt about a longitudinal axis in accordance with the well understood practice.

The front axle 17 also has pivoted to its ends the steering knuckles 18 (only one of which appears in Fig. 2); and the tractor also includes the usual steering wheel 19 by means of which these knuckles are turned during the usual steering operations of the tractor.

The particular corn gathering machine herein disclosed includes a frame designated generally by the numeral 20. This frame includes a transverse top frame bar 21. It also includes the rearwardly extending side bars 22 and 23 which extend rearwardly from the ends of the bar 21, and the rear ends of the bars 22 and 23 are joined together by a cross bar 24.

Figure 3:
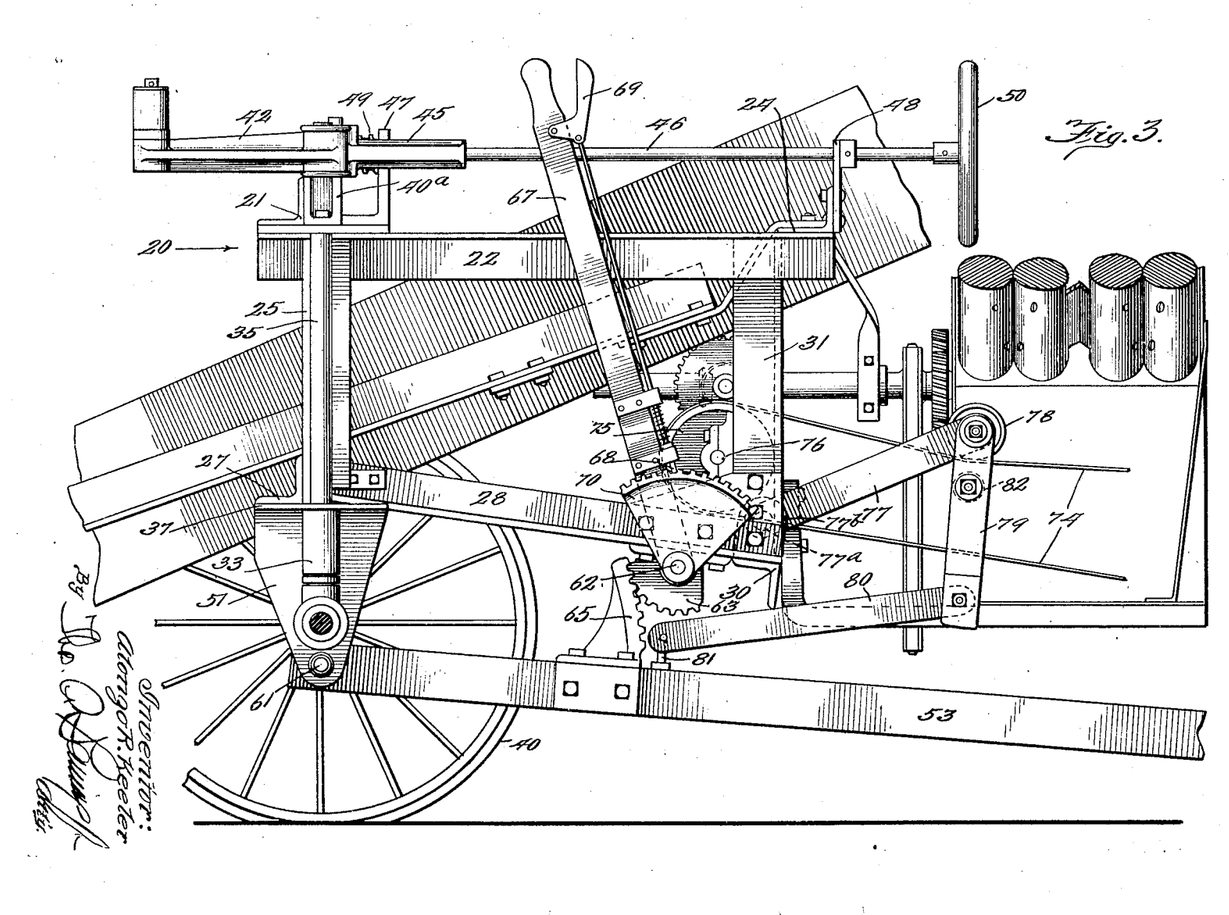
Figure 4:
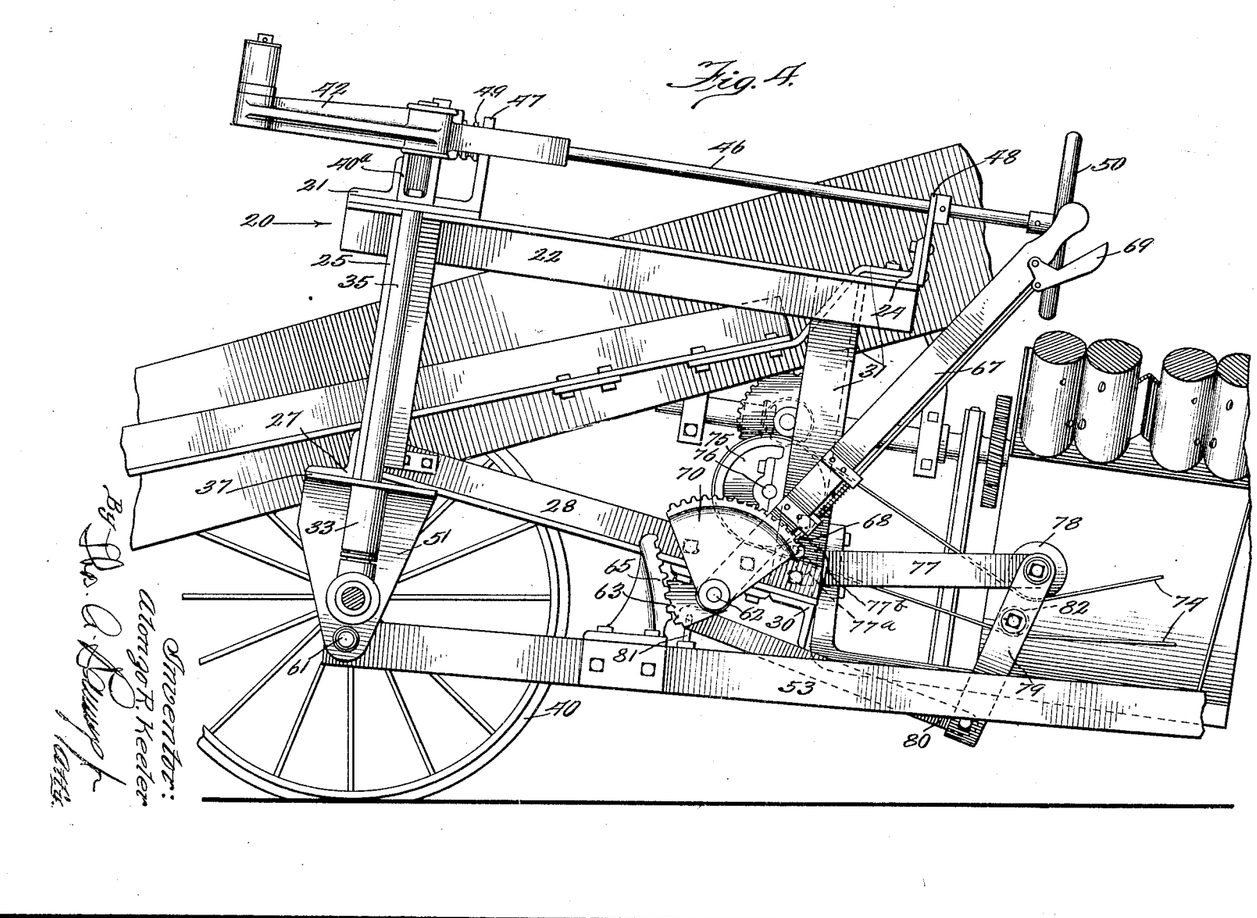
Fig. 4 shows a view similar to that of Fig. 3 with the exception that the lever has been thrown backward to its extreme position in order to raise the front end of the agricultural implement as much as possible. This figure also shows the belt tightener in the corresponding position; and a portion of the rack segment has been broken away to reveal the devices located behind the same.
Figures 5, 6:
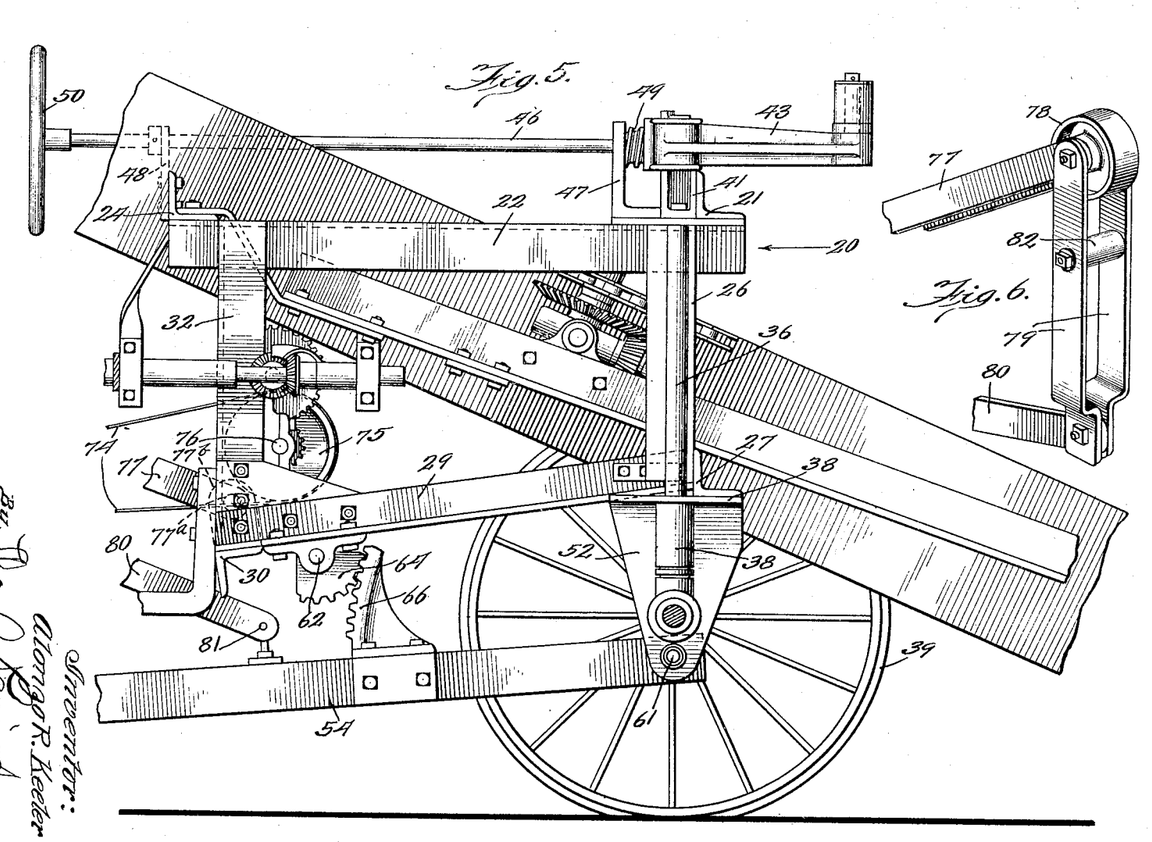
Fig. 5 shows a fragmentary side view corresponding to Fig. 3 but looking from the other side of the machine; in each of the Figs. 3, 4 and 5, the steering wheel at the near side of the machine has been removed so as to better reveal the other parts.
Fig. 6 shows a fragmentary perspective view of the swinging portion of the belt tightener.

Reaching down from the cross bar 21 at the positions of the bars 22 and 23 are the vertical posts 25 and 26. The lower ends of these posts are connected together by a cross bar 27. There are a pair of side bars 28 and 29 extending rearwardly from the bar 27 at the positions of the lower ends of the posts 25 and 26. The rear ends of the pairs 28 and 29 are joined together by the cross bar 30 (see Figs. 3, 4 and 5). There is also a pair of vertical posts 31 and 32 reaching between the rear portions of the bars 22—28 and 23—29 respectively.

It thus happens that the rear portion of the agricultural implement includes a substantially rectangular open work box-like frame.

Secured to the lower side corners of this frame there are the journal bearings 33 and 34 for the lower ends of the steering wheel posts 35 and 36 respectively. These bearings take a form of sleeves surrounding the posts and located beneath the flanges 37 and 38 which reach sidewise from the lower front corners of the frame. The lower ends of the posts 35 and 36 are turned outwardly at right angles to establish bearings or knuckles upon which are journaled the steering wheels 39 and 40 respectively. The weight of the frame of the agricultural implement is thus communicated to said wheels through the medium of the sleeves 33 and 34.

The upper ends of the steering posts 35 and 36 are journaled in the upper front corners of the frame by means of boxes 40 and 41. To the upper ends of the steering posts there are connected the forwardly projecting arms 42 and 43 the front ends of which are connected together by the reach rod 44 (see Figs. 1 and 2). The post 35 also carries at its upper end the curved rack bar 45.

The steering shaft 46 is journaled in the front and rear brackets 47 and 48 on the upper corner of the frame at that side nearest to the rack 45. The front end of the steering shaft 46 carries a worm 49 meshing with the rack and the rear end of said shaft carries the steering wheel 50.

It thus appears that by turning the steering wheel 50 the wheels 39 and 40 of the agricultural implement are turned for the steering function.

Reaching downwardly from the front portion of the frame there are the triangular plates 51 and 52. These are rigidly connected to the frame and constitute downward extensions therefrom.

There is a triangular cradle frame reaching from the rear end of the tractor at the position of the draw bar, forwardly beneath the tractor and into connection with the plates 51 and 52 just referred to. This cradle frame includes the side bars 53 and 54, the rear ends of which are brought together by means of a rectangular hollow box like casting 55 (see Fig. 9). This casting 55 is large enough to receive the draw bar lug 56 on the rear end of the tractor itself with a sufficient amount of clearance to allow the cradle frame to oscillate or rock about a horizontal longitudinally extending axis which passes forwardly beneath the tractor. The box 55 is connected to the draw bar 56 by a vertical pin 57 dropped into place through these parts; but the hole in the draw bar 56 is large enough to allow the aforesaid oscillation to take place without interference and with the maximum amount of movement necessary.

Figures 8, 10:
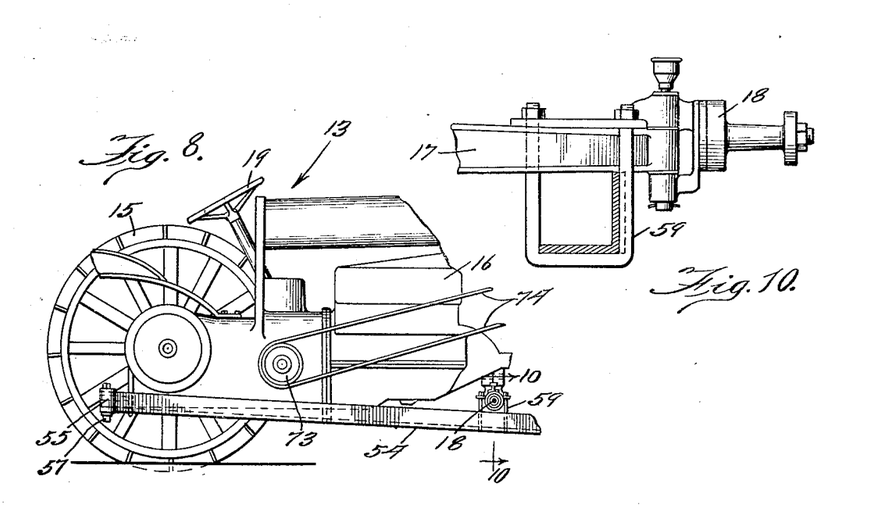
Fig. 8 shows a side view corresponding to Fig. 7; but with the traction wheel at the near side of the machine removed.
Fig. 10 shows a fragmentary section on the line 10—10 of Fig. 8 looking in the direction of the arrows.

The cradle passes beneath the front axle 17 of the tractor which axle is connected to the cradle in any convenient manner as by means of brackets 58 (see Fig. 2) or by means of U bolts 59 (see Figs. 8 and 10). The result is that the front axle 17 rests upon and is rigidly connected to the side bars of the cradle frame, the front wheels of the tractor proper having been removed from the spindles 18.

Figures 7, 9:
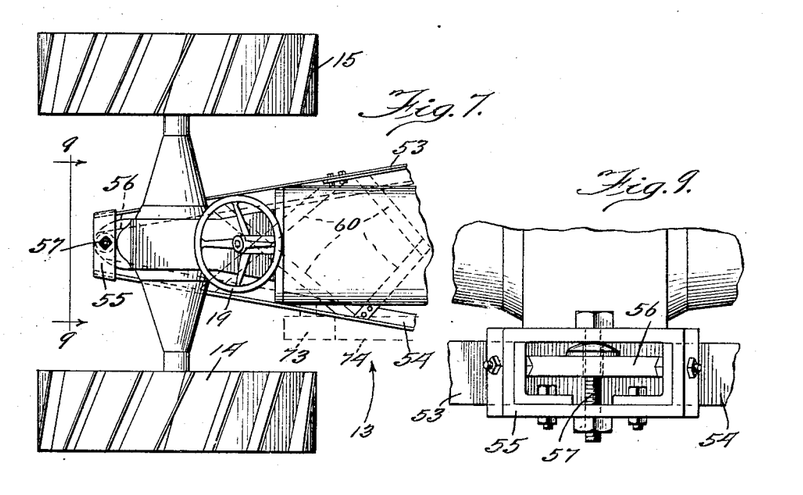
Fig. 7 shows a fragmentary plan view of the rear end of a familiar form of tractor having applied thereto a traction connection embodying the features of the present invention.
Fig. 9 shows a fragmentary rear view of the draw bar of the tractor, having applied thereto the rear portion of the traction connection of the present invention.

The side bars 53 and 54 of the cradle frame may if desired be connected together and reinforced by a lattice including angular cross passes 60 (see Fig. 7).

The front ends of the cradle bars are pivotally connected to the lower portions of the triangular plates 51 and 52 by means of a cross rod 61 which reaches through all of these parts and pivotally connects them together as shown in several of the figures. Thus it happens that the frame of the agricultural implement itself may be rocked back and forth on an axis extending transversely of the combined machine, thus making it possible to tilt the entire agricultural implement with respect to the cradle frame and the tractor.

The axial rod or pin 61 is located substantially in line with but slightly below the centers of the steering wheels 39 and 40 of the agricultural implement. Consequently the weight of the front portion of the cradle frame (which includes the front portion of the tractor itself) is communicated to the pivot bar 61 somewhat below the centers of the wheels 39 and 40. By so designing the agricultural implement and properly placing this pivot bar 61 in the plates 51 and 52, the pivot bar will stand directly under the centers of the wheels when the agricultural implement is at the normal or central position of its pivotal movement. In order to tilt the agricultural movement in either direction therefrom it is necessary to raise the pivot bar 61 slightly so that a force must be applied for this purpose. By properly relating the parts however, they are largely in a condition of balance, since the rearwardly extending portion of the frame or the agricultural implement will largely balance the forwardly extending portions of said implement. Thus I have provided a construction whereby the tilting operations in both directions may be very easily accomplished.

There is a shaft 62 journaled to the bars 28 and 29 and extending across the boxlike frame already referred to. This shaft carries the rack segments 63 and 64 which mesh with corresponding segments 65 and 66 on the side bars 53 and 54 of the cradle frame. Consequently the turning of the shaft 62 will cause the segments 63 and 64 to ride up and down on the corresponding segments 65 and 66 thereby tilting the agricultural implement with respect to the front end of the cradle frame.

For the foregoing purpose the shaft 62 is provided with an operating lever 67 having the usual latch 68 and hand grip 69. The latch 68 engages the segment 70 on the bar 28. Thus it is possible by setting the lever 67 into the proper position to set the tilt of the agricultural implement to whatever point may be desired.

The lever 67 occupies a position relatively close to the hand wheel 50 by which the combined machine is steered. It is thus possible for the operator to perform the necessary evolutions for changing the tilt of the agricultural implement from time to time as well as steering the machine.

It is not deemed necessary at this time in this application to describe the construction and mode of operation of the corn gathering element in detail. It may be stated, however, that the same includes various devices which are power driven, including various chain conveyors such as 71, an elevator 72 by means of which the picked and husked ears are carried up and delivered to a wagon or other receiving element. All of these power devices are supplied by power delivered from the engine 16. For this purpose said engine includes a pulley 73 which may receive a belt 74; said belt passes over another pulley 75 secured to the shaft 76 which is journalled in the box like frame projecting rearwardly from the corn gathering element. This shaft 76 in turn drives the various power driven elements through chain and gear drives the details of which it is not deemed necessary to describe herein.

It will be noted that as the agricultural implement is tilted back and forth the position of the pulley 75 changes with respect to the position of the pulley 73. Consequently the belt 74 must be adjusted from time to time in order to maintain the proper driving conditions. I have therefore provided a slack take-up which I will now describe in detail. Mounted on the frame bar 30 is a bracket 77$^b$, and pivoted on the bracket 77$^b$ at the point 77$^a$ is an arm 77 which is free to move up and down, journaling on the point 77$^a$ for this purpose. At its rear end said arm 77 carries an idler pulley 78 which rests upon the top run of the belt 74. The arm 77 is preferably a double arm as shown in perspective in Fig. 6 so that the pulley is journaled between the ends of the parts thereof.

Reaching down from the outer end of the arm 77 is a yoke 79, and the lower end of this yoke is pivotally connected to the rear end of an arm 80. The front end of the arm 80 is pivoted to the side bar 53 of the cradle frame by means of a bracket 81. The arm 80 passes beneath the cross bar 30 at the lower rear corner of the boxlike frame, and the parts are so related that as the agricultural implement is tilted the bar 30 pushes down on the arm 80 and thus draws down the pulley 78 through the medium of the yoke 79. The parts are so related that this movement is at all times substantially correct in amount and nature to take up the slack of the belt and maintain the same in a taut condition.

If necessary another pulley or roller 82 is placed between the yoke arms 79, the same serving to push down the bottom run of the belt in case of extreme movement so as to prevent the top and bottom runs of the belt from interfering with each other.

By the foregoing means it is evident that a proper driving connection is maintained from the engine to the agricultural implement at all times and proper combination is effected.

It will be understood that the agricultural implement or corn gatherer 12 includes at its front end a series of points 83, 84 and 85 which are pivotally connected to the main frame of the agricultural implement and may swing up and down for relatively slight adjustments and irregularities in the ground surface. These points normally ride on the surface of the ground in the position indicated in Fig. 2. When the agricultural implement is tilted into the position of Fig. 1 said points will continue to rest on the surface of the ground until the backward tilt becomes sufficient to take up the full extent of their possible movement with respect to the frame of the agricultural implement, whereupon the points also will be raised above the surface of the ground.

It will also be understood that the conveyor 72 is mounted upon and carried by the frame work of the agricultural implement so that said conveyor always occupies the correct position with respect to the moving parts of the corn gathering machine itself. The parts are so arranged that during the backward tilt of the corn gathering implement this conveyor will not strike or interfere with the tractor or other portions of the combined implement.

While I have herein shown and described only a single embodiment of the features of my present invention still I do not intend to limit myself thereto except as I may do so in the claims.

I claim:

1. In a device of the class described, the combination with a tractor having driving wheels, of a traction connection extending to a position in advance thereof, said traction connection being rigid in a fore and aft direction and capable of sustaining load in that direction, an agricultural implement in advance of the tractor and traction connection and having a pair of steering land wheels, located at opposite sides of the machine, a transverse axial connection between the front portion of the traction connection and the agricultural implement at points immediately adjacent to the steering land wheels permitting rocking movement between these parts about a transverse axis at right angles to the direction of travel, racks on the traction connection, pinions on the agricultural implement, meshing with said racks, and means under the control of the operator for adjusting the positions of the pinions on the racks, to thereby adjust the degree of tilt between the agricultural implement and the traction connection on such axis, substantially as described.

2. In a device of the class described, the combination of a tractor, an agricultural implement in advance thereof, a pair of supporting land wheels for the sides of the agricultural implement, and a traction connection reaching beneath the tractor to a position in proximity to the agricultural implement and serving to support the load of the front portion of the tractor and transmit traction forwardly to the agricultural implement, a pivotal connection between the traction connection and the agricultural implement adjacent to the positions of the supporting land wheels permitting rocking movement between these parts on an axis extending transversely of the device and at right angles to the direction of travel, and means under control of the operator for adjusting and securing the degree of tilt of the agricultural implement with respect to the traction connection on the axis, substantially as described.

3. In a device of the class described, the combination of a tractor, an agricultural implement in advance thereof having ground supporting means, and a traction connection extending between these parts, a pivotal connection between the front portion of the traction connection and the agricultural implement adjacent to the ground supporting means permitting rocking movement between these parts on an axis extending transversely of the machine and at right angles to the direction of travel, and means under control of the operator for adjusting and securing the parts in desired position on the axis, substantially as described.

4. In a device of the class described, the combination of a tractor, an agricultural implement in advance thereof and pushed thereby, ground supporting means for the agricultural implement, a pivotal connection between the tractor and the agricultural implement adjacent to the ground supporting means permitting these parts to be rocked with respect to each other about a transverse axis, and means under control of the operator for adjusting the position of these parts with respect to each other on the axis, substantially as described.

5. In a device of the class described, the combination of a tractor, an agricultural implement in advance thereof and having at its front end a series of toes adapted to travel on the surface of the ground being traversed, said toes being vertically adjustable with respect to the agricultural implement, means for limiting the amount of such adjustability, ground supporting means for the agricultural implement, a pivotal connection between the tractor and the agricultural implement adjacent to the ground supporting means permitting rocking movement between these parts on an axis extending transversely of the machine and at right angles to the direction of travel, and means under control of the operator for adjusting and securing the rocked position between these parts on the axis, substantially as described.

6. In a device of the class described, the combination of a tractor, an agricultural implement in advance thereof and having suitable devices for gathering and collecting ear corn from stalks in the field, said devices including power driven instrumentalities, a pivotal connection between the tractor and said implement permitting rocking movement between these parts on an axis extending transversely of the machine and at right angles to the direction of travel, ground supporting means for the agricultural implement in substantial proximity to said axis, means under control of the operator for adjusting and securing the parts in desired rocked position on the axis, a belt drive connection between the tractor and the power driven instrumentalities aforesaid, a slack take-up in conjunction with said belt drive, and means for adjusting the position of said slack take-up as the tractor and agricultural implement are adjusted with respect to each other on the transverse axis aforesaid, substantially as described.

7. In a device of the class described, the combination of a tractor, an agricultural implement in advance thereof and having suitable devices for gathering and collecting ear corn from stalks in the field, said devices including power driven instrumentalities, a pivotal connection between the tractor and said implement permitting rocking movement between these parts on an axis extending transversely of the machine and at right angles to the direction of travel, ground supporting means for the agricultural implement in substantial proximity to said axis, means under control of the operator for adjusting and securing the parts in desired rocked position and a power drive connection between the tractor and the power driven instrumentalities aforesaid, said connection including power driving means adjustable as to length and angle harmoniously with the adjustment of the agricultural implement with respect to the tractor, substantially as described.

8. In a device of the class described the combination of a tractor, an agricultural implement in advance thereof, and having suitable devices for gathering and collecting ear corn from stalks in the field, said devices including a husker and a conveyor extending upwardly at an angle away from the implement for the purpose of delivering husked ears at an elevated point sidewise with respect to the implement, a pivotal connection between the tractor and said implement permitting rocking movement between these parts on an axis extending transversely of the machine and at right angles to the direction of travel, ground supporting means for the agricultural implement in substantial proximity to said axis and means under control of the operator for adjusting and securing the parts in desired rocked position on the axis, the arrangement being such that the agricultural implement including the husker and conveyor move entirely clear of the tractor throughout all normal ranges of adjustment, substantially as described.

9. In a device of the class described the combination of a tractor, an agricultural implement in advance thereof and having suitable devices for gathering and collecting ear corn from stalks in the field, said devices including power driven instrumentalities, a pivotal connection between the tractor and said implement permitting rocking movement between these parts on an axis extending transversely of the machine and at right angles to the direction of travel, ground supporting means for the agricultural implement in substantial proximity to said axis, means under control of the operator for adjusting and securing the parts in desired rocked position, a belt drive connection between the tractor and the power driven instrumentalities aforesaid, a swinging arm pivotally connected on the agricultural implement and reaching backwardly adjacent to the belt drive aforesaid, an idler pulley on said arm engaging the run of the belt to take up the slack thereof, and means effective to swing said arm and cause the pulley to take up said slack in accordance with the tilting movement between the tractor and the agricultural implement, substantially as described.

10. In a device of the class described the combination of a tractor, an agricultural implement in advance thereof and having suitable devices for gathering and collecting the ear corn from stalks in the field, said devices including power driven instrumentalities, a pivotal connection between the tractor and said implement permitting rocking movement between these parts on an axis extending transversely of the machine and at right angles to the direction of travel, ground supporting means for the agriculture implement in substantial proximity to said axis, a belt drive connection between the tractor and the power driven instrumentalities aforesaid, an arm pivotally connected to the agricultural implement and extending adjacent to the belt drive, an idler pulley on said arm engaging the run of the belt, and means for swinging said arm to move the idler pulley in proportion to the tilting action between the parts to thereby insure proper belt drive at all tilted positions, substantially as described.

11. In a device of the class described the combination of a tractor, an agricultural implement in advance thereof and having suitable devices for gathering and collecting ear corn from stalks in the field, a traction connection extending beneath the tractor and forwardly thereof, a pivotal connection between the traction connection and the agricultural implement, permitting rocking of these parts about a horizontal transverse axis and at right angles to the direction of travel, ground supporting means for the agricultural implement in substantial proximity to said axis, suitable steering land wheels in the agricultural implement serving to support the same and also to support the front portion of the traction connection, an operator's stand on the traction connection, a steering wheel convenient of access to an operator at said stand, and means also convenient of access to an operator at said stand for adjusting and securing the position of tilt of the agricultural implement with respect to the traction connection, substantially as described.

ALONZO R. KEELER.